United States Patent
Desbiolles et al.

(10) Patent No.: US 9,236,831 B2
(45) Date of Patent: Jan. 12, 2016

(54) METHOD OF OPERATING A POWER SUPPLY AND COMMUNICATION ENTITY AND AN ACTUATOR WHICH ARE INTENDED TO FORM PART OF A HOME-AUTOMATION SYSTEM

(71) Applicant: Somfy SAS, Cluses (FR)

(72) Inventors: Claude Desbiolles, Eteaux (FR); Florian Germain, Meythet (FR); Daniel Mugnier, Passy (FR); Stephane Riffaud, Sallanches (FR); Nicolas Terrier, Bonneville (FR)

(73) Assignee: SOMFY SAS, Cluses (FR)

( * ) Notice: Subject to any disclaimer, the term of this patent is extended or adjusted under 35 U.S.C. 154(b) by 0 days.

(21) Appl. No.: 14/360,857

(22) PCT Filed: Dec. 6, 2012

(86) PCT No.: PCT/EP2012/074705
§ 371 (c)(1),
(2) Date: May 27, 2014

(87) PCT Pub. No.: WO2013/083728
PCT Pub. Date: Jun. 13, 2013

(65) Prior Publication Data
US 2014/0333231 A1 Nov. 13, 2014

(30) Foreign Application Priority Data
Dec. 6, 2011 (FR) ........................ 11 61197

(51) Int. Cl.
*H02P 31/00* (2006.01)
*G08C 17/02* (2006.01)
*G08C 19/00* (2006.01)
*H04L 12/28* (2006.01)
*E06B 9/68* (2006.01)

(52) U.S. Cl.
CPC . *H02P 31/00* (2013.01); *E06B 9/68* (2013.01); *G08C 17/02* (2013.01); *G08C 19/00* (2013.01); *E06B 2009/6809* (2013.01); *H04L 12/2803* (2013.01)

(58) Field of Classification Search
CPC ....................................................... H02P 31/00
USPC ............................................... 318/3, 34, 255
See application file for complete search history.

(56) References Cited

U.S. PATENT DOCUMENTS 5,746,060 A * 5/1998 Sunaga et al. .................. 62/126
6,078,159 A * 6/2000 Valente ................. E05F 15/668
318/468

(Continued)

FOREIGN PATENT DOCUMENTS

EP 1 274 199 A 1/2003
EP 1 626 154 A 2/2006

*Primary Examiner* — David S Luo
(74) *Attorney, Agent, or Firm* — Frommer Lawrence & Haug LLP

(57) ABSTRACT

Method of operating a power supply and communication entity intended to form part of a system with at least one home-automation actuator comprising an electric motor for driving a movable element in a building, the power supply and communication entity comprising two electrical terminals for linking to the actuator, making it possible to power the actuator and allowing communication between the actuator and the power supply and communication entity, the method comprising two mutually exclusive modes of operation, a command execution mode and a communication mode, to each mode of operation there corresponding a specific power supply signal, the method comprising the steps: —choice of a mode of operation; —generation between the terminals of a power supply signal specific to the mode of operation chosen.

26 Claims, 13 Drawing Sheets

(56) References Cited

U.S. PATENT DOCUMENTS

| | | | |
|---|---|---|---|
| 7,129,662 B2 * | 10/2006 | D'ayot | 318/468 |
| 7,131,051 B2 * | 10/2006 | Von Wendorff | 714/774 |
| 2002/0196376 A1 | 12/2002 | Symoen et al. | |
| 2006/0033460 A1 | 2/2006 | D'ayot | |

* cited by examiner

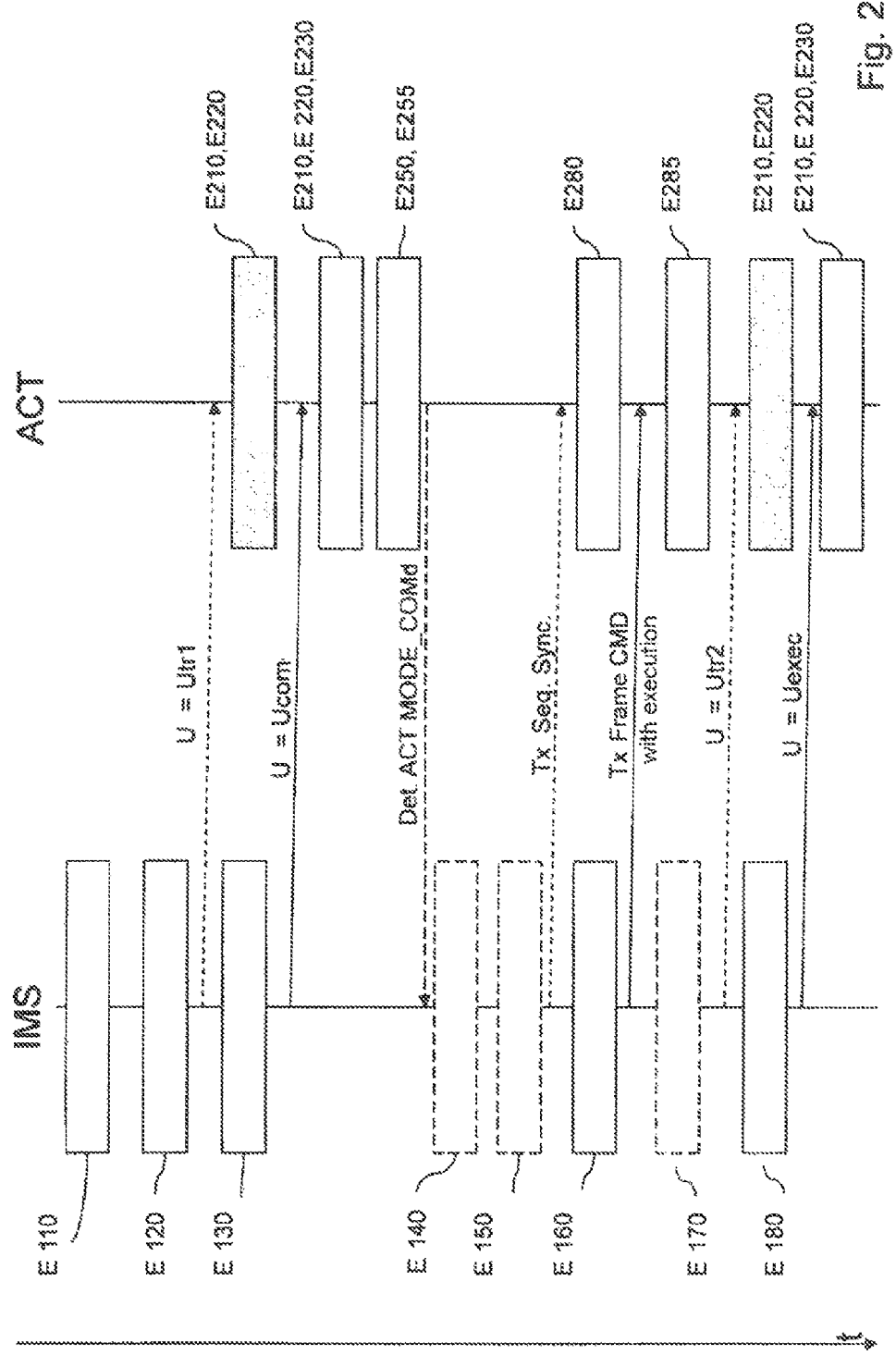

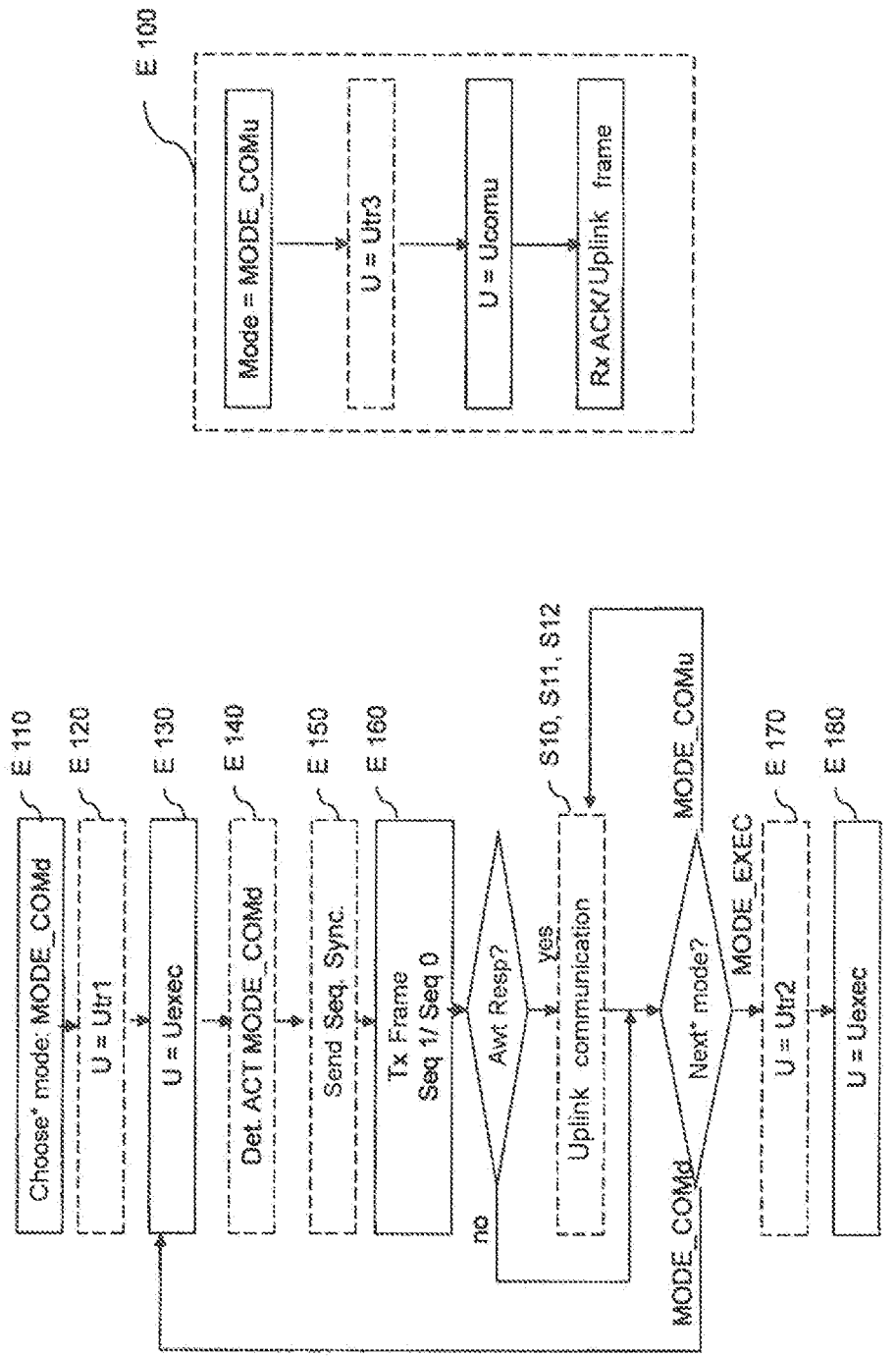

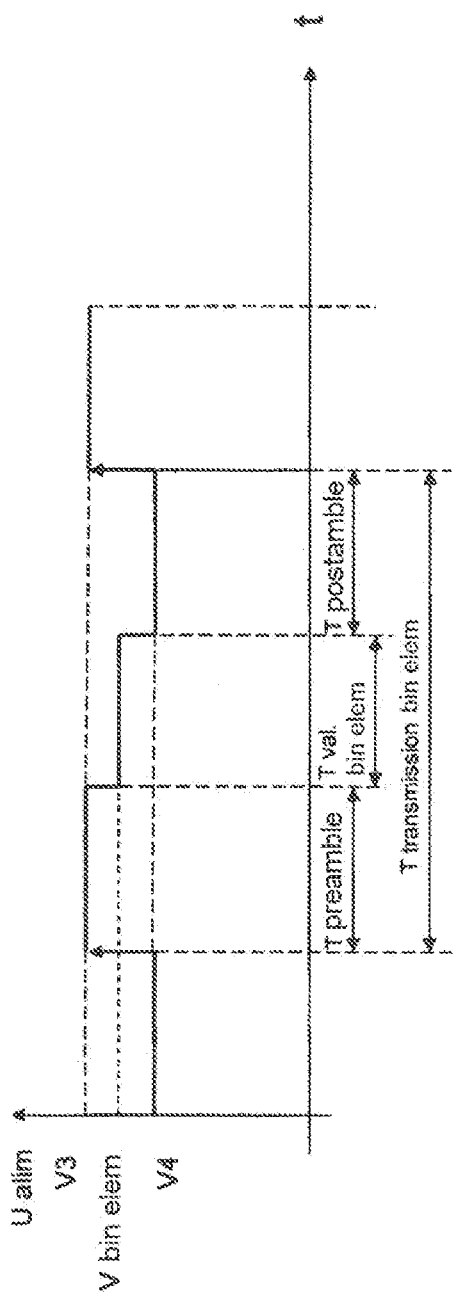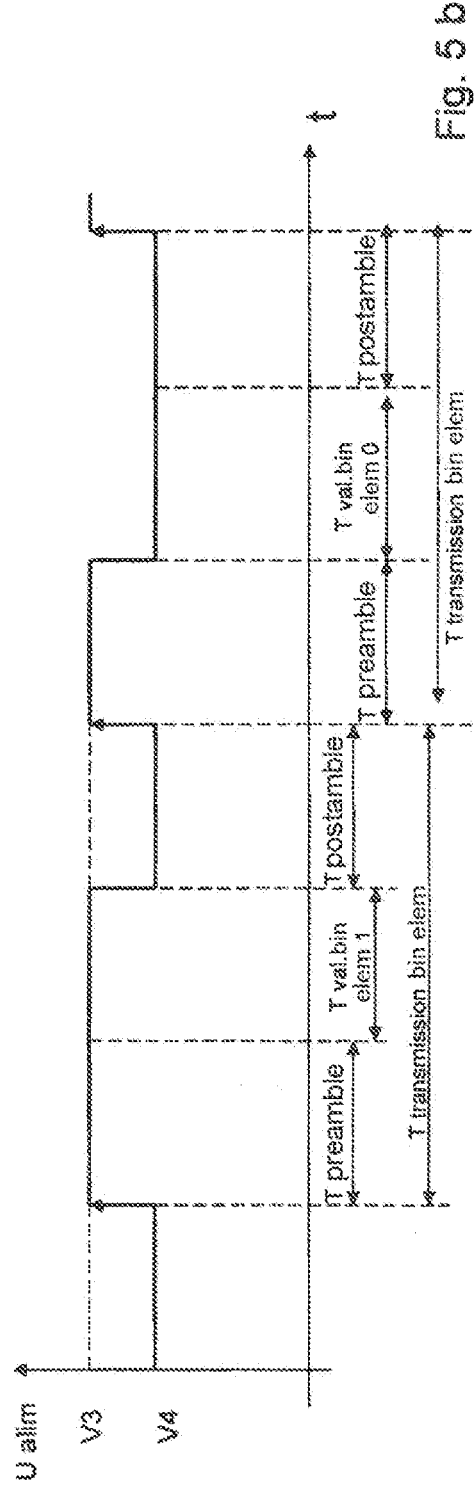

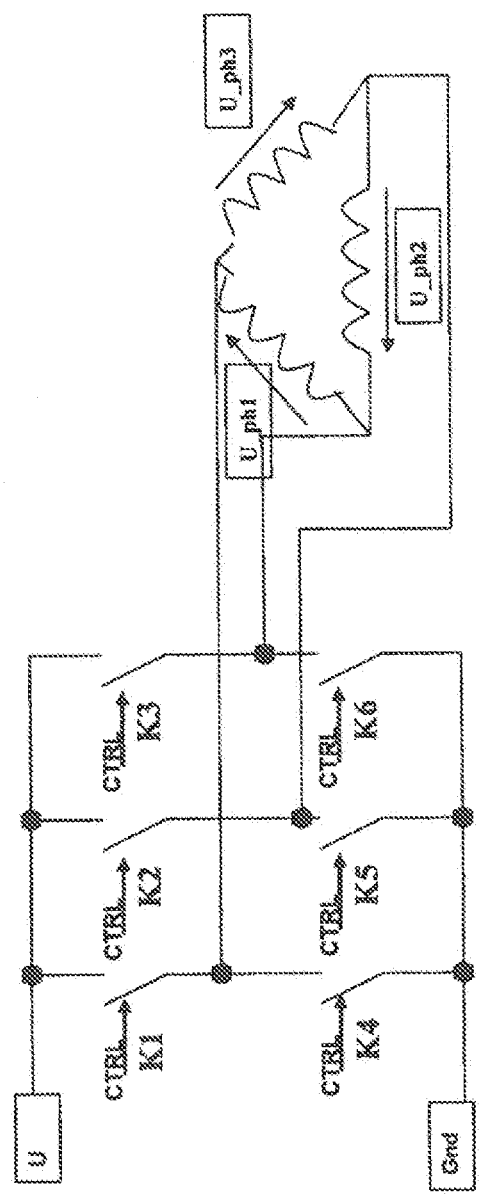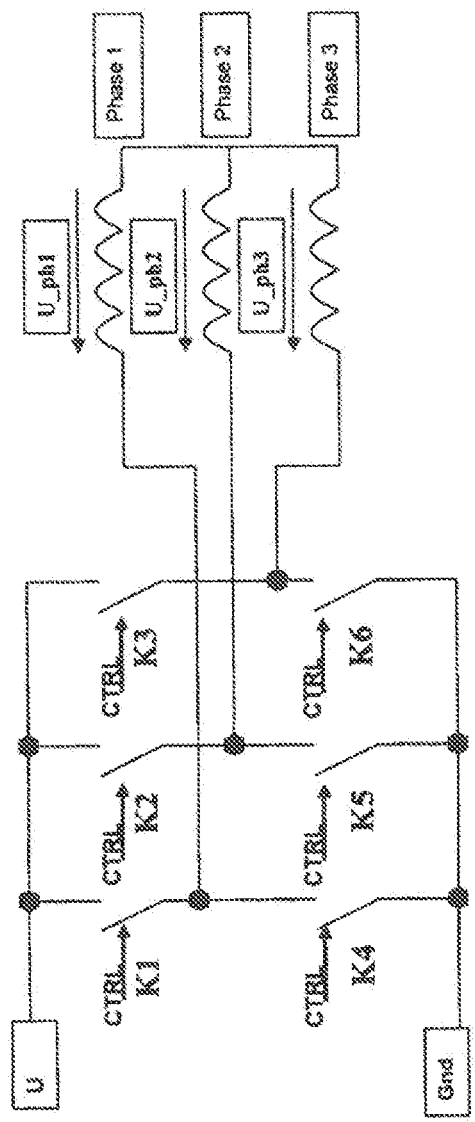
Fig. 6a
Fig. 6b

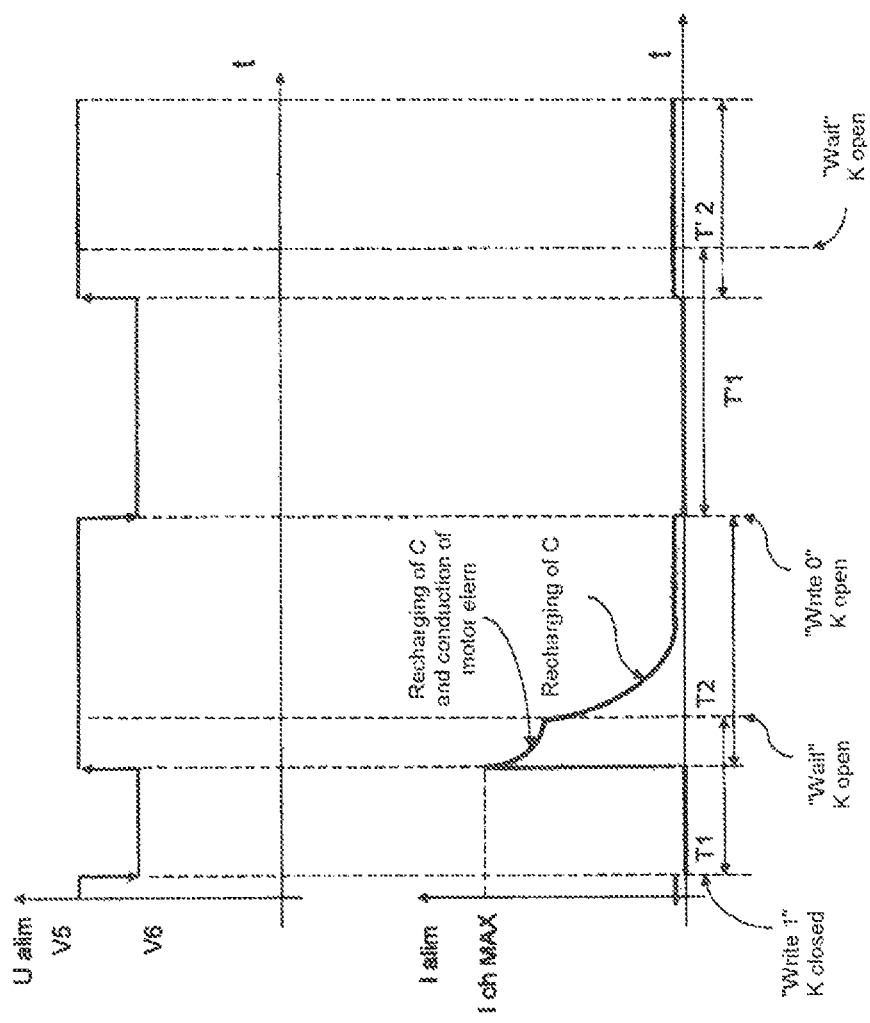

METHOD OF OPERATING A POWER SUPPLY AND COMMUNICATION ENTITY AND AN ACTUATOR WHICH ARE INTENDED TO FORM PART OF A HOME-AUTOMATION SYSTEM

This application is a 371 of PCT/EP2012/074705 filed on Dec. 6, 2012, published on Jun. 13, 2013 under publication number WO 2013/083728 A, which claims priority benefits from French Patent Application Number 1161197 filed Dec. 6, 2011, the disclosure of which is incorporated herein by reference.

FIELD OF THE INVENTION

The invention relates to the field of home automaton installations comprising electrical actuators for driving a movable element in a building, such as solar protections or closures.

During normal operation on the site, these actuators are controlled by way of a radio interface and/or a wire-based interface.

In the course of fine tuning, production, assembly of the carrier product in the factory, identification and diagnosis of an actuator on site, it is necessary to dialogue with the actuator, so as to transmit and/or receive information such as assembly date, torque, speed, serial number, etc.

This dialogue is performed with the aid of a power supply and communication entity capable of powering the actuator and of communicating with the latter.

The communication must be performed so as to cover the entire range and with a minimum cost overhead.

PRIOR ART

Solutions for carrying out a communication between an actuator and a power supply and communication entity are known, for example using the wire-based interface for actuator power supply and another interface, radio, for communication. This solution has the drawback of the systematic use of a radio interface, which is not compatible with all actuators.

Another solution consists in using two dedicated wire-based interfaces, one for electrical power supply and another for communication. This solution has the drawbacks of additional cost and additional bulk.

Another solution consists in using only the electrical power supply wire-based interface and superimposing the power supply and communication signals. This solution, known by the name of power-line carrier, requires additional electronics for modulating/demodulating the signals which entails an increase in cost.

Another solution, disclosed by patent EP1274199, uses only the electrical power supply wire-based interface and, in order to communicate, the power supply and communication entity interrupts the power supply in a manner synchronized with the mains. This solution exhibits the drawback of a slow bitrate, due to the synchronization to the electrical network and of a quality of the signal which is contingent on the quality of the network.

To transmit information to the power supply and communication entity, the actuator can respond by a movement in one direction, in the opposite direction or a succession of movements. The information feedback given by the actuator is of very low bitrate, about 1 bit/s.

Problem

The aim of the invention is to provide a method of operating a power supply and communication entity, an actuator, and a system comprising these elements, remedying the drawbacks mentioned and improving the methods known from the prior art. In particular, the invention proposes a simple, reliable and inexpensive method while allowing a significant data bitrate.

Definitions

Hereinafter in this document, the following terms will be used:

Actuator: home-automation actuator comprising an electric motor for driving a movable element in a building.

Power supply and communication entity: entity providing or receiving actuator information; this entity also provides the electrical power supply to the actuator.

Downlink communication: sending by the power supply and communication entity and reception by the actuator.

Uplink communication: sending by the actuator and reception by the power supply and communication entity.

Communication: downlink and/or unlink communication.

Waveform: a temporal representation of the characteristic variations of a signal, such as the amplitude, the frequency, the phase.

Communication mode: mode of operation in which the elements of the home-automation system, the actuator and the power supply and communication entity, can perform a downlink and/or uplink communication.

Command execution mode: mode of operation in which the elements of the home-automation system, the actuator and the power supply and communication entity, allow the execution of commands by the actuator, notably by the activation of the motor.

Home-automation system: system comprising a power supply and communication entity, at least one actuator and means of electrical and communication connection between this entity and this actuator.

According to a first aspect, the invention relates to a method of operating a power supply and communication entity, respectively of a home-automation actuator comprising an electric motor for driving a movable element in a building in a home-automation system.

The invention also relates to a method of operating a system comprising a power supply and communication entity and at least one home-automation actuator comprising an electric motor for driving a movable element in a building, the method of operation comprising at least two mutually exclusive modes of operation, a command execution mode and a communication mode, to each mode of operation there corresponding a specific power supply signal. This method comprises the following steps:

choice of a mode of operation by the power supply and communication entity and of generation of the power supply signal specific to the mode of operation chosen:

determination by the actuator of at least one characteristic of the power supply signal specific to the chosen mode of operation and of comparison of this characteristic with the characteristics of the signals specific to each mode of operation; and implementation, by the power supply and communication entity, respectively by the actuator of the mode of operation chosen.

The power supply and communication entity and the actuator comprise electrical terminals linked by two wires able to connect the actuator to an electrical power supply generated by the power supply and communication entity, and to constitute a physical medium for communication between the actuator and the power supply and communication entity.

The method governs the operation of a power supply and communication entity intended to form part of a system with at least one home-automation actuator comprising an electric motor for driving a movable element in a building. The power supply and communication entity comprises two electrical terminals for linking to the actuator making it possible to power the actuator and allowing communication between the actuator and the power supply and communication entity. The method comprises two mutually exclusive modes of operation, a command execution mode and a communication mode, to each mode of operation there corresponding a specific power supply signal. The method comprises the steps:
 choice of a mode of operation,
  generation between the terminals of a power supply signal specific to the mode of operation chosen.

The power supply signal specific to the command execution mode can be an AC voltage and the power supply signal specific to the communication mode can be a DC voltage.

The power supply signal specific to the command execution mode can be a DC voltage having a first value and the power supply signal specific to the communication mode can be a DC voltage having a second different value.

In downlink communication operating mode, the method can furthermore comprise a step of sending data in the form of a succession of binary elements, each binary element being represented by the waveform of the power supply signal and comprising
 a preamble consisting of a DC voltage having a third value, and then
 a signal specific to each binary element, and then
 a postamble consisting of a DC voltage having a fourth value different from the third value.

The method can furthermore comprise a step of detecting the configuration of the actuator for the mode of operation chosen prior to the step of sending data.

The method can furthermore comprise a step of transition between the command execution mode and the communication mode consisting in generating on the terminals a first transient power supply signal of predefined waveform and predefined amplitude.

The method can furthermore comprise a step of transition between the communication mode and the command execution mode consisting in generating on the terminals a second transient power supply signal of predefined waveform and predefined amplitude.

The method can comprise:
 generating a variation of a first type of the specific power supply signal,
 generating a variation of a second type of the specific power supply signal,
 analysing a characteristic of a response signal subsequent to the variation of the second type,
 deducing from the previous analysis step, a datum associated with the characteristic.

Two variations of first and second type can compensate one another.

The specific power supply signal can comprise iterations of successions:
 of a DC voltage having a fifth value, and
 of a DC voltage having a sixth value,
 the variation of first type making it possible to pass from the fifth value to the sixth value, and
 the variation of second type making it possible to pass from the sixth value to the fifth value.

The method governs the operation of a home-automation actuator comprising an electric motor for driving a movable element in a building, the actuator being able to form part of a system with a power supply and communication entity, the actuator comprising two electrical terminals for linking to the power supply and communication entity making it possible to power the actuator and allowing communication between the actuator and the power supply and communication entity. The method comprises two mutually exclusive modes of operation, a command execution mode and a communication mode, to each mode of operation there corresponding a specific power supply signal. The method comprises the steps:
 determination of at least one characteristic of the power supply Signal; and
 comparison of the characteristic of the power supply signal with the characteristics of the power supply signals specific to each mode of operation.

The method can furthermore comprise a step of determining the mode of operation of the system and a step of configuring the actuator for the mode of operation determined.

The step of configuring the actuator for the mode of operation chosen can comprise a sub-step of configuring the impedance of the actuator.

In an uplink communication mode, the method can furthermore comprise a step of sending an information item by the actuator in which the actuator performs at least one modification of its impedance seen from its electrical terminals.

In a downlink communication operating mode, the method can furthermore comprise a step of receiving data in the form of a succession of binary elements, each binary element being represented by the waveform of the power supply signal and comprising
 a preamble consisting of a DC voltage having a third value and then;
 a signal specific to each binary element; and then
 a postamble consisting of a DC voltage having a fourth value, different from the third value.

In an uplink communication operating mode, the method can comprise:
 detecting a variation of a first type of the specific power supply signal,
 setting a first configuration of at least one element defining a first impedance internal to a circuit of the actuator and associated with a first datum or setting a second configuration of the at least one element defining a second impedance internal to the circuit of the actuator and associated with a second datum,
 maintaining the configuration set in the previous step for a determined duration.

On completion of the determined duration, it is possible to set the first configuration of the at least one element.

The at least one element can comprise a switch, notably a switch in series with a resistive element, in particular an assembly comprising a switch in series with a resistive element, the whole in parallel with a capacitor.

The switch can be open to define the first configuration.

Subsequent to the step of detecting the variation of the first type, it is possible to decouple the circuit from the electrical terminals, notably by activation of a decoupling element.

Subsequent to a step of detecting a variation of a second type of the specific power supply signal, it is possible to couple the circuit to the electrical terminals, notably by deactivation of a decoupling element.

The method governs the operation of a system comprising a power supply and communication entity and at least one home-automation actuator comprising an electric motor for driving a movable element in a building. The method of operation comprises at least two mutually exclusive modes of operation, a command execution mode and a communication mode, to each mode of operation there corresponding a specific power supply signal. The method comprises the steps:
- choice of a mode of operation by the power supply and communication entity and of generation of the power supply signal specific to the mode of operation chosen;
- determination by the actuator of at least one characteristic of the power supply signal specific to the mode of operation chosen and of comparison of this characteristic with the characteristics of the signals specific to each mode of operation; and
- implementation, by the power supply and communication entity, and/or by the actuator, of the mode of operation chosen.

A power supply and communication entity is intended to form part of a system, with at least one home-automation actuator comprising an electric motor for driving a movable element in a building. The power supply and communication entity comprises:
- two electrical terminals making it possible to power the actuator and allowing communication between the actuator and the power supply and communication entity; and
- means:
  - for implementing at least two mutually exclusive modes of operation, a command execution mode and a communication mode, to each mode of operation there corresponding a specific power supply signal;
  - for choosing a mode of operation;
  - for generating between the electrical terminals a power supply signal specific to the mode of operation chosen.

The invention also relates to a recording medium readable by a processor on which is recorded a computer program comprising instructions suited to the execution of the steps of the previously defined method of operating a power supply and communication entity.

A home-automation actuator comprises an electric motor for driving a movable element in a building. The actuator is able to be used in a system, with a power supply and communication entity. The actuator comprises:
- two electrical terminals for linking to the power supply and communication entity making it possible to power the actuator and allowing communication between the actuator and the power supply and communication entity;
- means
  - for implementing at least two mutually exclusive modes of operation, a command execution mode and a communication mode, to each mode of operation there corresponding a specific power supply signal; and
  - for determining at least one characteristic of tic power supply signal; and
  - for comparing the characteristic of the power supply signal with the characteristics of the power supply signals specific to each mode of operation.

The actuator can comprise means for determining the mode of operation of the system and means for placing in configuration for the mode of operation determined.

The invention also relates to a recording medium readable by a processor on which is recorded a computer program comprising instructions suited to the execution of the steps of the method of operating an actuator defined previously.

According to the invention, a system comprises at least one power supply and communication entity defined previously and at least one actuator defined previously.

In a particular embodiment of the invention, the method implemented by the power supply and communication entity, respectively the actuator, the power supply voltage specific to the command execution mode is an AC voltage, for example provided by the commercial distribution network and the power supply voltage specific to the downlink and/or uplink communication mode is a DC voltage.

In another particular embodiment of the invention, the method implemented by the power supply and communication entity, respectively the actuator, the power supply voltage specific to the command execution mode is a DC voltage having a first value and the power supply voltage specific to the downlink and/or uplink communication mode is a DC voltage having second value, different from the first.

If the mode of operation chosen is a downlink communication mode, the method comprises a step of sending data by the power supply and communication entity in the form of a succession of binary elements, each binary element being represented by the waveform of the power supply voltage and comprising
- a preamble consisting of a DC voltage having a third value;
- a signal specific to each binary element;
- a postamble consisting of a DC voltage having a fourth value different from the third value.

Advantageously, whatever the succession of the bits in a byte, transitions take place by virtue of the different values of the voltage for the postamble and the preamble. The successions over time of these transitions allow communication between the power supply and communication entity and the actuator without it being necessary to synchronize them. The values of the power supply voltage for the preamble and the postamble can take one of the values specific to a mode of operation, the only constraint being to have values which differ between the postamble and the preamble.

Preferably the two values differ from 0 V. In this way, whatever the values of the binary elements transmitted and the duration of the transmission, the power supply and communication entity can fulfil its electrical power supply function.

The method implemented by the power supply and communication entity can comprise a step of transition between the command execution mode and the communication mode consisting in generating between its electrical terminals a first transient power supply signal, of predefined waveform and predefined amplitude.

This embodiment makes it possible to ensure optimized initial conditions for the communication operating mode.

The value of this transition voltage can be equal to 0 V for a predetermined duration, thus ensuring the discharging of the protection and decoupling capacitors.

In a preferred embodiment, the method implemented by the power supply and communication entity furthermore comprises a step of transition between and the communication mode and the command execution mode consisting in generating between its electrical terminals a second transient power supply signal, of predefined waveform.

This embodiment has the advantage of ensuring optimized initial conditions for the command execution mode.

In a particular embodiment, the method implemented by the power supply and communication entity furthermore comprises a step of detecting the configuration of the actuator for the mode of operation chosen prior to the step of sending data.

In this manner, in downlink communication mode, the power supply and communication entity does not begin to send as long as the actuator is not correctly configured, to avoid repetitions.

In a particular embodiment, the method implemented by the actuator furthermore comprises a step of determining the mode of operation of the system and a step of configuring the actuator for the mode of operation determined.

The actuator can, subsequent to this detection, ensure the initial conditions necessary for the mode of operation chosen, for example the initialization of the communication software module.

In a preferred embodiment, the step of configuring the actuator for the mode of operation chosen comprises a substep of configuring the impedance of the actuator.

This solution has the advantage of using the electronics already existing in the actuator to implement a new function, by configuring the motor in the guise of load impedance. Note that this solution does not entail any additional cost and that the impedance modification may be detectable by the power supply and communication entity.

Other characteristics of the invention will be understood with the aid of the figures which illustrate exemplary embodiments devoid of any limiting character.

FIGS. 2 and 2a represent two operating sequences of a system implementing the invention, illustrating exchanges between the power supply and communication entity IMS and the actuator ACT.

FIG. 3 represents, in flowchart form, a particular embodiment of the method implemented by a power supply and communication entity IMS in accordance with the invention, during a downlink communication.

FIGS. 5a and 5b represent data sequences in the downlink communication mode.

FIGS. 6a and 6b represent examples of actuators able to implement the invention.

Figure 10:
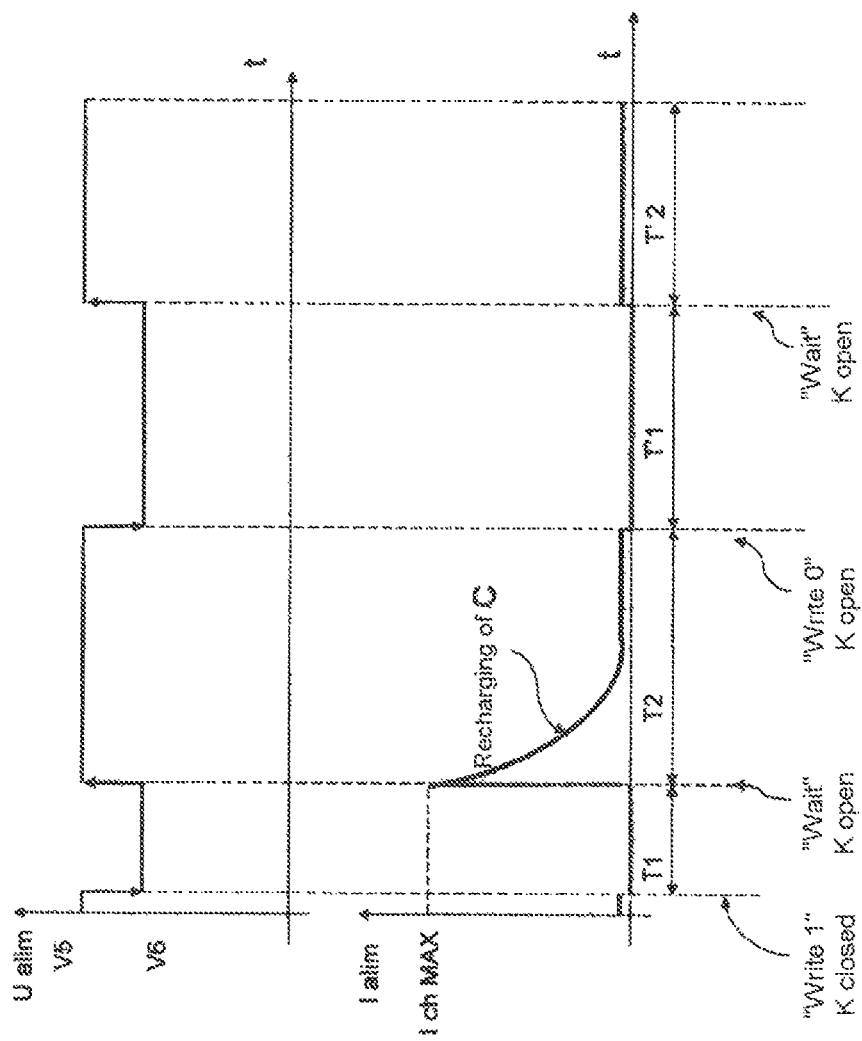
Figure 11:
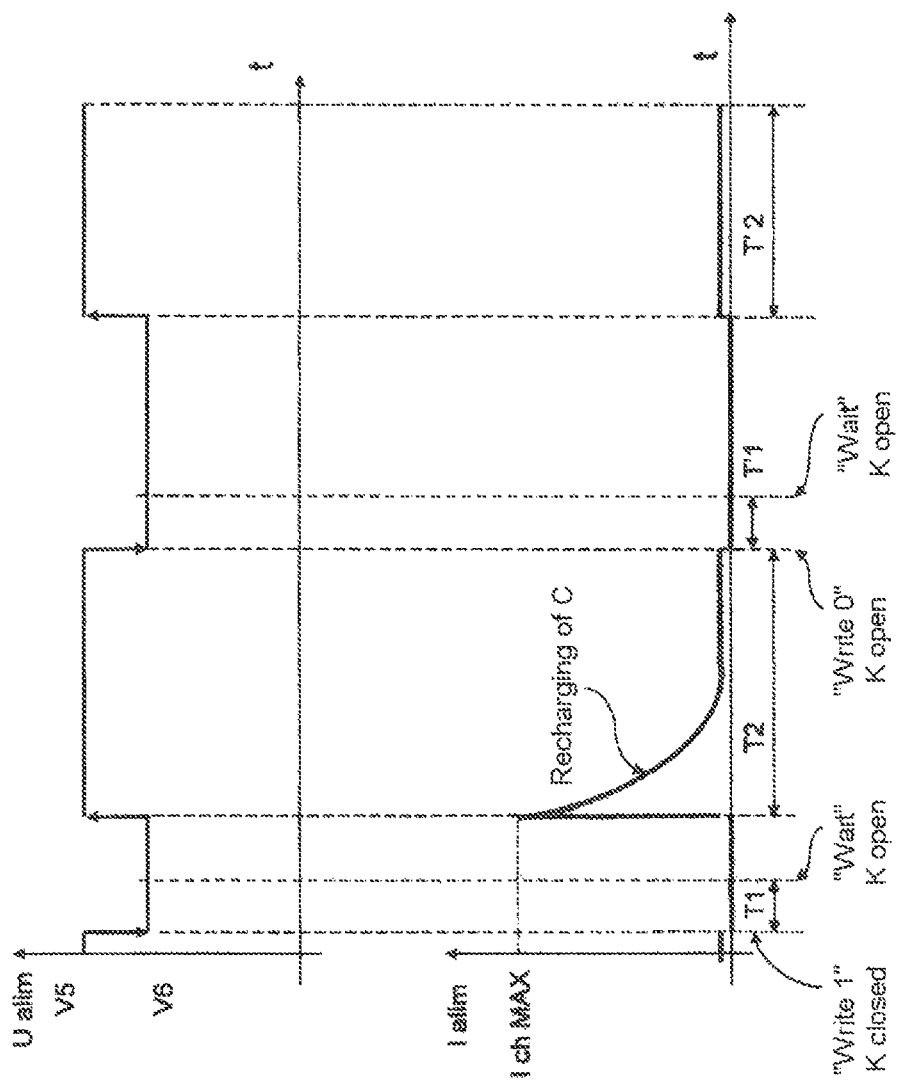

FIGS. 10 to 12 describe timecharts illustrating three variants of a particular mode of uplink communication.

DETAILED DESCRIPTION OF A PREFERRED EMBODIMENT

Figure 1:
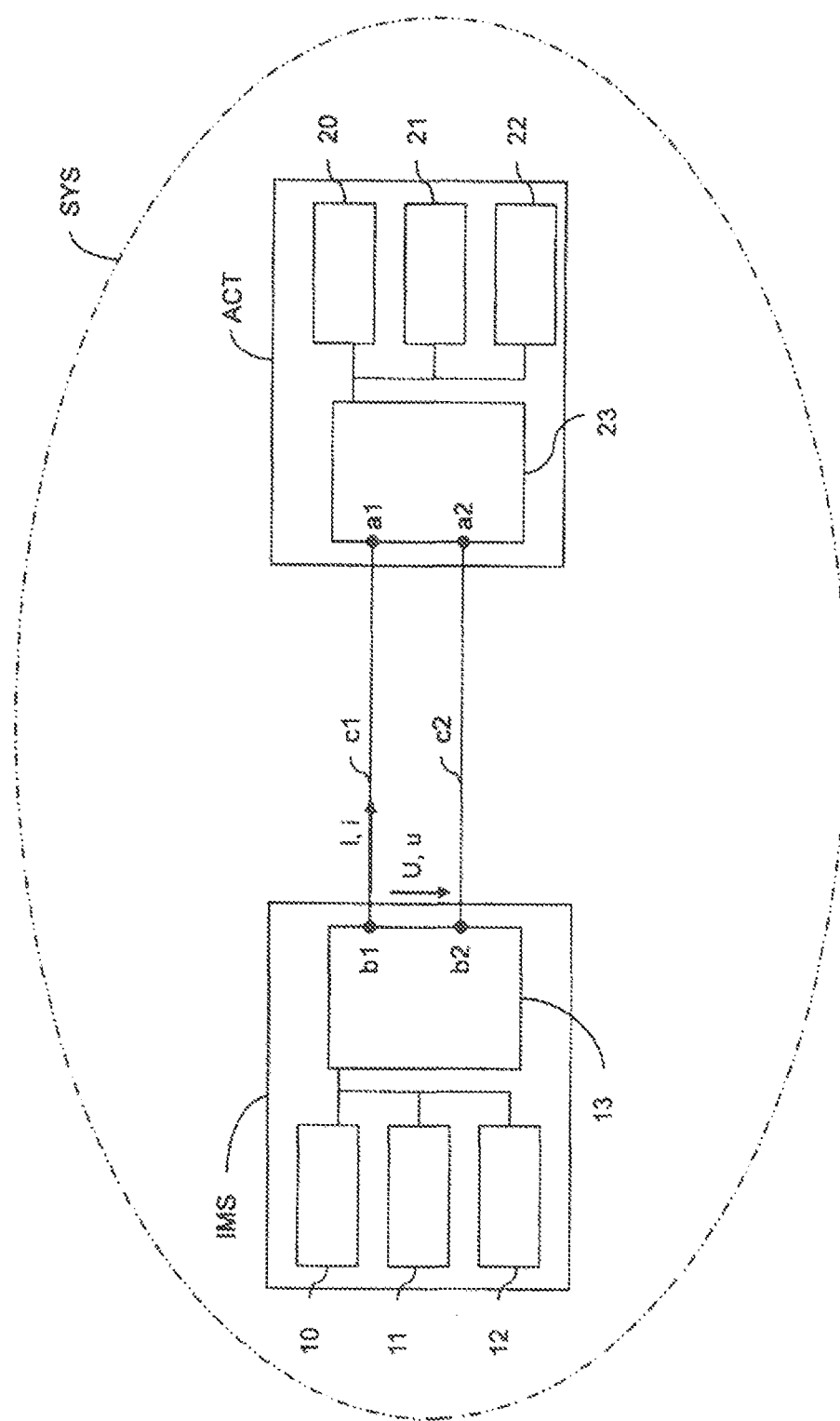
FIG. 1 represents a home-automation system in which the invention can be implemented.

In FIG. 1 is represented a home-automation system comprising a power supply and communication entity IMS comprising a processor 10, a random-access memory of RAM type 11, a nonvolatile program memory, optionally rewritable, of ROM or flash type 12 and a line interface 13 making it possible to power the actuator ACT and to communicate with the latter by way of the two electrical terminals b1, b2.

In FIG. 1 is also represented an actuator ACT comprising a processor 20, a random-access memory of RAM type 21, a nonvolatile program memory, optionally rewritable, of ROM or flash type 22 and a line interface 23 for receiving the power supply voltage and communicating with the power supply and communication entity IMS by way of the two electrical terminals a1, a2. The actuator is preferably a home-automation actuator. It comprises an electric motor for driving a movable element of a building, such as a movable element for closure, shading, solar protection or screening.

The line interfaces 13 and 23 are connected by two wires c1, c2 able to connect the actuator ACT to an electrical power supply generated by the power supply and communication entity IMS and to constitute a physical medium for communication between the actuator ACT and the power supply and communication entity IMS.

The power supply and communication entity IMS, the actuator ACT and the system SYS comprising these elements implement at least two mutually exclusive modes of operation, a command execution mode MODE_EXEC and communication mode, downlink MODE_COMd, and/or an uplink MODE_COMu.

An embodiment of the method of operation implemented by the power supply and communication entity IMS is described with reference to FIGS. 2, 3 and 7.

The power supply and communication entity IMS chooses an operating mode in a step E110. This choice of the operating mode can be made, for example:

subsequent to an order sent by a computer: the power supply and communication entity IMS being connected to this computer by a link of known type, such as Ethernet; the computer can then send to the power supply and communication entity IMS the order to choose a mode of operation and communicate to it the parameters to be used;
  subsequent to the action of an operator, the power supply and communication entity IMS being able to comprise a Man-Machine Interface;
  by the execution of an embedded software (SW) on the power supply and communication entity IMS;
  subsequent to a frame previously sent by the power supply and communication entity IMS, using the downlink communication mode MODE_COMd:
    if the frame carries a command requiring execution, the mode of operation chosen will be the command execution mode MODE_EXEC;
    if the frame carries a message which must be followed by a response sent by the actuator ACT, the mode of operation chosen will be the uplink communication mode MODE_COMu.

In the example described by FIG. 3, the mode of operation chosen is the downlink communication mode MODE_COMd. To ensure optimized initial operating conditions, the power supply and communication entity IMS, generates, in the course of an optional transition step E120, a first transient power supply signal between the wires c1 and c2, whose waveform is predefined.

Figure 7:
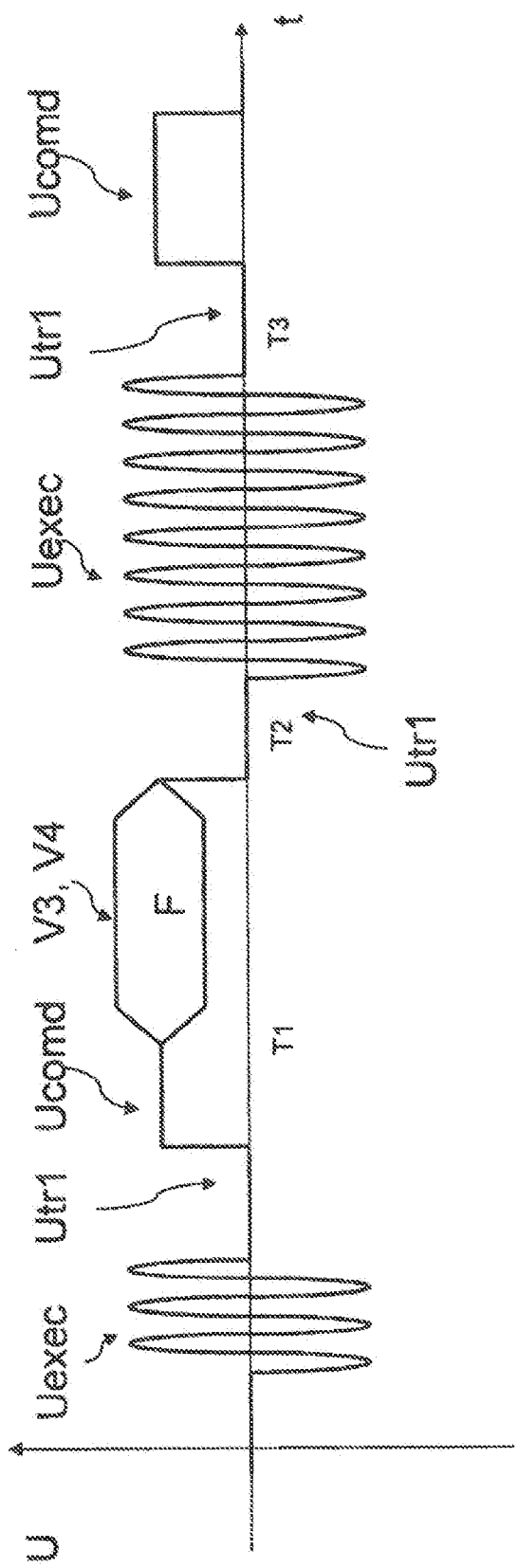
FIG. 7 represents examples of a power supply voltage corresponding successively to the various modes of operation.

As illustrated by FIG. 7, the first transient power supply signal Utr1 can be a voltage equal to 0 V for a predetermined duration, thus allowing the discharging of capacitors situated at the level of the actuator and the establishment of optimized initial hardware conditions for the actuator ACT.

An example of such a voltage Utr1 is illustrated by FIG. 7; at the end of the power supplied under AC voltage corresponding to the command execution mode, the power supply voltage is maintained at 0 V for a duration T3, thus allowing the establishment of the optimized initial conditions for the following mode of operation.

Alternatively, the power supply and communication entity IMS can interrupt the power supply, by opening of the relays.

Thereafter, in the course of a step E130, the IMS control unit generates on the wires c1, c2, a power supply voltage Uexec, Ucomd, Ucomu specific respectively to each mode of operation MODE_EXEC, MODE_COMd, MODE_COMu.

This specific power supply voltage is characterized by its waveform.

Figure 4:
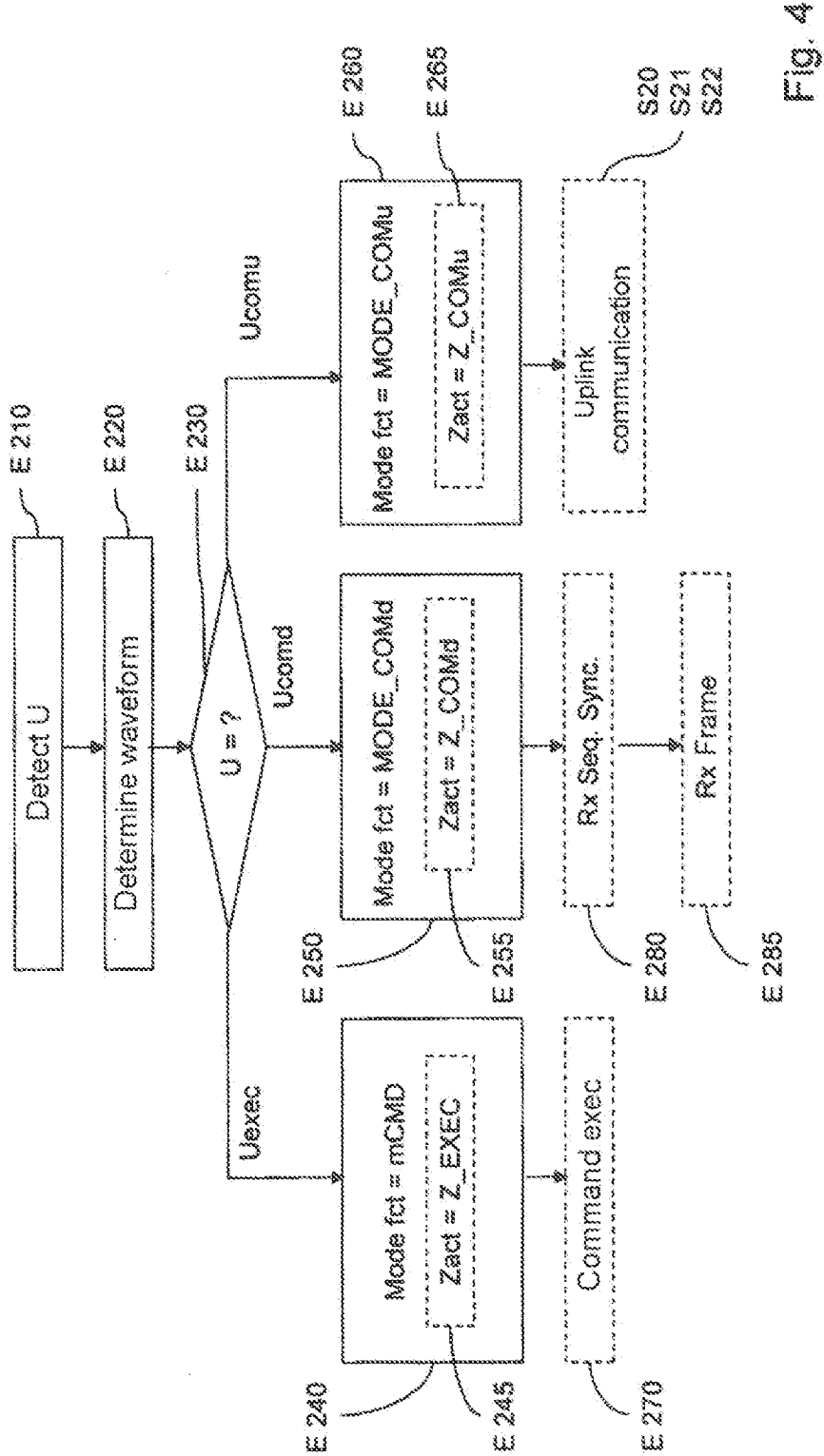
FIG. 4 represents, in flowchart form, a particular embodiment of the method implemented by an actuator ACT in accordance with the invention, during a downlink communication.

In parallel, an embodiment of a method of operation implemented by the actuator ACT is described with reference to FIGS. 2, 4 and 7.

The actuator ACT is able to detect, in the course of a step E210, the power supply voltage provided by the power supply and communication entity IMS on the wires $c_1$, $c_2$; the actuator, using known sampling and storage techniques, determines, in the course of a step E220, the waveform and/or the amplitude of the power supply signal and compares, in the course of a step E230, the power supply signal detected with power supply voltages Uexec, Ucomd, Ucomu, respectively with power supply currents Iexec, Icomd, Icomu specific to each mode of operation MODE_EXEC, MODE_COMd, MODE_COMu, so as to deduce the mode of operation chosen by the power supply and communication entity.

In one embodiment illustrated by FIG. 7, the power supply signal specific to the command execution mode Uexec is an AC voltage, for example provided by the electricity distribution network; the power supply voltage can exhibit several amplitudes and frequencies, depending on the network used.

In this embodiment the power supply signal specific to the uplink communication mode Ucomd and/or downlink communication mode, Ucomu is a DC voltage. The amplitudes of these power supply voltages may be equal or different, an additional indication being provided in this latter case to the actuator ACT.

Alternatively, the power supply signal specific to the command execution mode Uexec is a DC voltage having a first value V1. The power supply signal specific to the communication mode Ucomd, respectively Ucomu, is a DC voltage having a value V2, respectively V3, different from the first value V1. The amplitudes of these power supply voltages V2, V3 in communication mode may be equal or different, an additional indication being provided in this latter case to the actuator ACT.

In a preferred embodiment, if the mode of operation chosen is a downlink communication mode MODE_COMd, the method implemented by the actuator ACT can comprise a step E240, E250, E260 of determining the mode of operation of the system and of configuring the actuator ACT for the mode of operation determined MODE_EXEC, MODE_COMd, MODE_COMu.

Step E240, E250, E260 of configuring the actuator ACT for the mode of operation chosen MODE_EXEC, MODE_COMd, MODE_COMu can also comprise a sub-step E245, E255, E265 of configuring the impedance Zact of the actuator ACT.

The invention can be implemented by using an actuator comprising a motor known by the person skilled in the art as a "brushless" type motor. Two types of a "brushless" motor are represented schematically in FIGS. 6a and 6b.

The control of these motors under normal operation is ensured by the electronic switches K1, K2, K3, K4, K5 and K6, embodied for example using MOS transistors, under the supervision of a module CTRL not represented. This normal mode of operation of the motor corresponds to the command execution mode within the meaning of the invention.

In uplink and/or downlink communication mode, the control module CTRL can configure the switches K1, K2, K3, K4, K5 and K6 in a different manner; in this case the load impedance presented by the motor of the actuator ACT varies as a function of the mode of operation chosen by the power supply and communication entity IMS and detected by the actuator ACT in the course of steps E110, respectively E240, E250, E260.

In one embodiment, the method implemented by the power supply and communication entity IMS furthermore comprises a step E140 of detecting the configuration of the actuator ACT for the mode of operation chosen, MODE_EXEC, MODE_COMd, MODE_COMu. Indeed, the power supply and communication entity IMS has means for generating a specific power supply signal for each mode of operation. If the power supply signal generated is a voltage, the power supply and communication entity IMS can comprise means for detecting current; alternatively; if the power supply signal generated is a current, the power supply and communication entity IMS can comprise means for detecting voltage. The power supply and communication entity IMS can thus determine the load impedance presented by the motor of the actuator ACT and deduce the mode of operation for which the actuator ACT is configured.

In one embodiment illustrated by FIGS. 3, 5a and 5b the mode of operation chosen is the downlink communication mode MODE_COMd. The method implemented by the power supply and communication entity IMS comprises a step E160 of sending data in the form of a succession of binary elements, each binary element being represented by a specific waveform of the power supply voltage. This specific waveform comprises a preamble consisting of a DC voltage having a third value V3;

a signal specific to each binary element;

a postamble consisting of a DC voltage having a fourth value V4 different from the third value V3.

In this embodiment, the method of operation implemented by the actuator ACT comprises a step E285 of receiving data in the form of a succession of binary elements, each binary element being represented by the waveform of the power supply voltage and comprising the preamble consisting of the DC voltage having the third value V3;

the signal specific to each binary element;

the postamble consisting of the DC voltage having the fourth value V4 different from the third value V3.

These values of the electrical power supply voltage V3, V4, are constrained to have different values, so as to ensure upon each transmission of a binary element transitions between the postamble of the binary element transmitted and the preamble of the following binary element.

In the embodiment illustrated by FIG. 5b, the signal specific to a binary element can take the same value as the DC voltage which constitutes the preamble, and the signal specific to the complementary binary element can take the same value as the DC voltage which constitutes the postamble.

Preferably the values V3, V4 of the power supply voltage are different from zero; in this manner, the power supply and communication entity can ensure its electrical power supply function whatever the duration and the content of the transmission.

The power supply and communication entity IMS can generate, in the course of an optional transition step E170, a second transient power supply voltage Utr2 of predefined waveform and/or predefined amplitude so as to ensure the transition between the communication operating mode and the command execution mode. An example of such a voltage Utr2 is illustrated by FIG. 7: at the end of the transmission of the frame F1, the power supply voltage is maintained at 0 V for a duration T2, thus allowing the establishment of the optimized initial conditions for the following mode of operation.

Figure 2A:
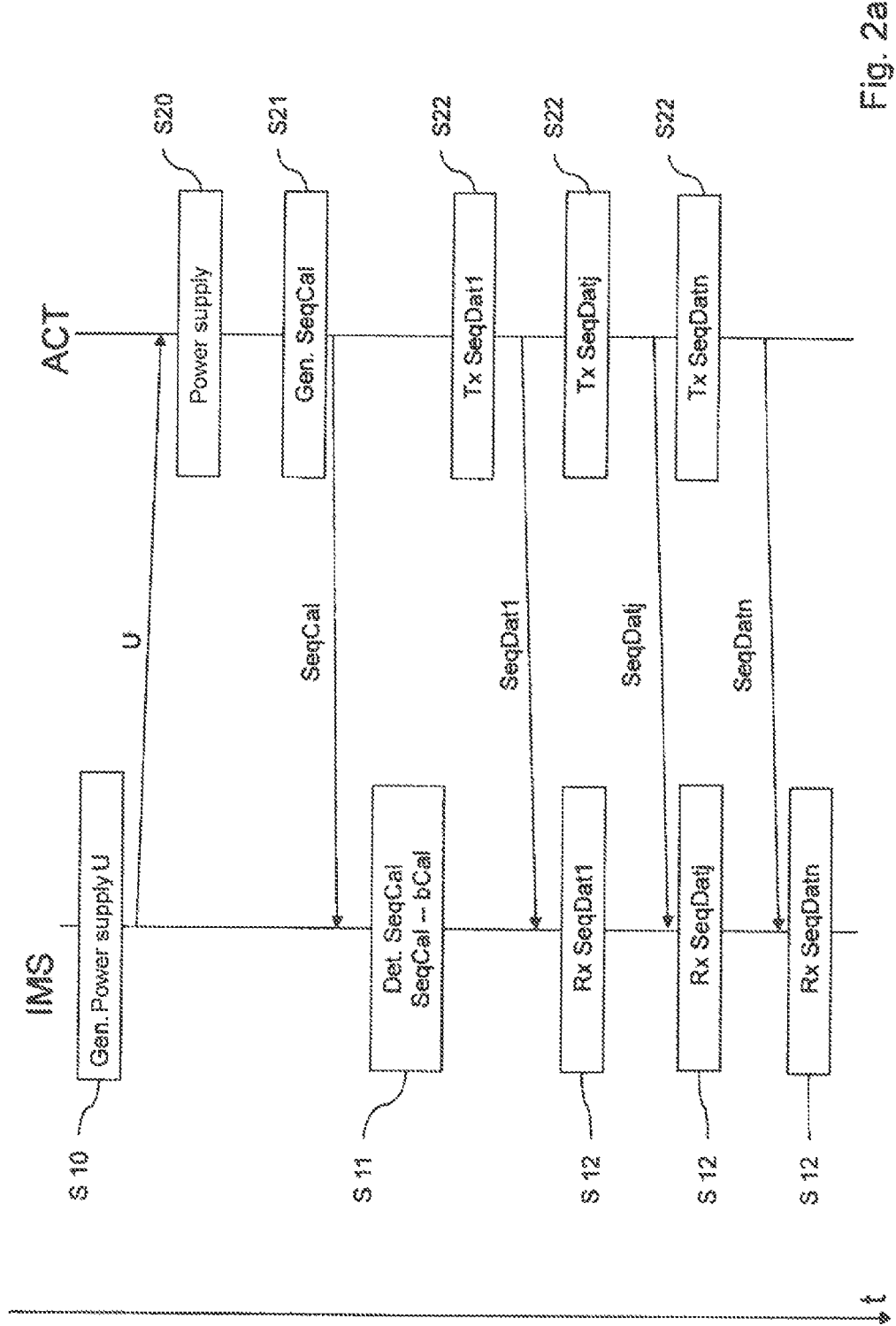

A particular embodiment, implementing the uplink communication mode MODE_COMu, will now be described with reference to FIGS. 1, 2a and 8.

As already mentioned, the power supply and communication entity IMS, provides the actuator ACT with an electrical power supply signal during a step S10.

The actuator ACT constitutes, seen from its terminals a1, a2, a load impedance for the power supply and communication entity IMS.

Subsequent to the connection of the wires c1, c2, between the electrical terminals a1, a2, of the actuator ACT and b1, b2, of the power supply and communication entity IMS, an electrical signal is established in response: if the electrical power supply is provided in the form of a voltage signal U, this signal is the intensity of the electric current I; if the electrical power supply is provided in the form of a current signal i, this signal is the intensity of the voltage u.

The response signal which is established depends on the one hand on the power supply signal provided by the power supply and communication entity IMS and on the other hand on the impedance of the actuator ACT. Indeed, the latter, by causing a variation of its impedance Zact, creates a variation of the response signal and thus transmits an information item to the power supply and communication entity IMS.

Communication between the actuator ACT and the power supply and communication entity IMS is then done by sending of data by the actuator ACT, in the form of a data frame constituting at least one part of the response signal. The data frame corresponds preferably to a series of binary elements, represented by variations of the response signal carried by the wires c1, c2.

The power supply and communication entity IMS comprises means for detecting current, respectively voltage. By using techniques known by the person skilled in the art, such as sampling and storage, the power supply and communication entity IMS can determine the variations over time of the response signal. A set of temporal variations of the response signal during a temporal period is called hereinafter in this document a "time-sequence of the response signal". The duration of the temporal period is determined according to a criterion shared by the actuator ACT and the power supply and communication entity IMS. Such a criterion can be a predetermined duration or the passing of the response signal, during its variations, through predefined threshold values, and optionally through extreme values between these predefined threshold values. The two criteria can be combined to delimit one and the same sequence, as will be explained subsequently.

A time-sequence of the response signal can be represented by a first time graph. Any set of temporal variations of the response signal that is representable by a second time graph identical or substantially identical to the first time graph is called an "image" of a time-sequence.

Subsequent to the establishment of the power supply signal, the actuator ACT generates, during a step S21, at least one first time-sequence of a response signal in terms of current I, respectively in terms of voltage u, representative of a first predetermined calibration binary element bCal, said the first calibration sequence SeqCal.

Optionally, a second time-sequence SeqCal2, representative of the second binary element, can be transmitted by the actuator ACT; alternatively the complementary binary element or this second sequence can be deduced from the first calibration sequence SeqCal.

The role of this step S21 is to transmit to the power supply and communication entity IMS the information relating to the encoding of the data which will be transmitted subsequently. In this manner the encoding can change upon each new connection and/or upon each modification of transmission conditions.

The power supply and communication entity IMS determines, during a step S11, at least the first calibration sequence SeqCal and assigns it a meaning representing the predetermined calibration binary element bCal. It can also in the course of this step S11 the representation of the complementary binary element.

Thereafter, the actuator ACT sends, in the course of a step S22, a data frame, in the form of a series of time-sequences SeqDat of the response signal I, respectively u, representative of a series of binary elements constituting the data frame to be sent.

The actuator ACT generates, for each data binary element equal to the calibration binary element bCal, a time-sequence of the response signal image of the first calibration sequence SeqCal.

A data binary element complementary to the calibration bit bCal can be represented by a time-sequence of the response signal image of the second calibration sequence SeqCal2.

The power supply and communication entity IMS detects the series of time-sequences SeqDat according to the shared criterion or criteria, during a step S12. Thereafter these sequences are decoded by comparison with the calibration sequence or sequences SeqCal, SeqCal2: a time-sequence SeqDat, image of the first calibration sequence SeqCal, is interpreted as a binary element equal to the calibration binary element bCal; a time-sequence SeqDat, image of the second calibration sequence SeqCal2, is interpreted as a binary element complementary to the calibration binary element bCal.

The generation of timesequences SeqCal, SeqCal2, SeqDat, by the actuator ACT is now described with reference to FIGS. 6 and 8.

During the command execution mode, the operation of the motor is controlled by electronic components, as illustrated in a schematic manner by FIG. 6.

During the uplink communication mode, the actuator ACT uses the electronic components, used in command execution mode for the control of the motor, in a different manner, that is to say in order to configure the actuator as a load impedance having particular values.

By varying the configuration of the electronic components, the actuator ACT can vary the load impedance Zact presented to the power supply and communication entity IMS; in this manner the actuator ACT can generate variations of the response signal in terms of current, respectively voltage, at these terminals a1, a2 and on the wires c1, c2.

Figure 8:
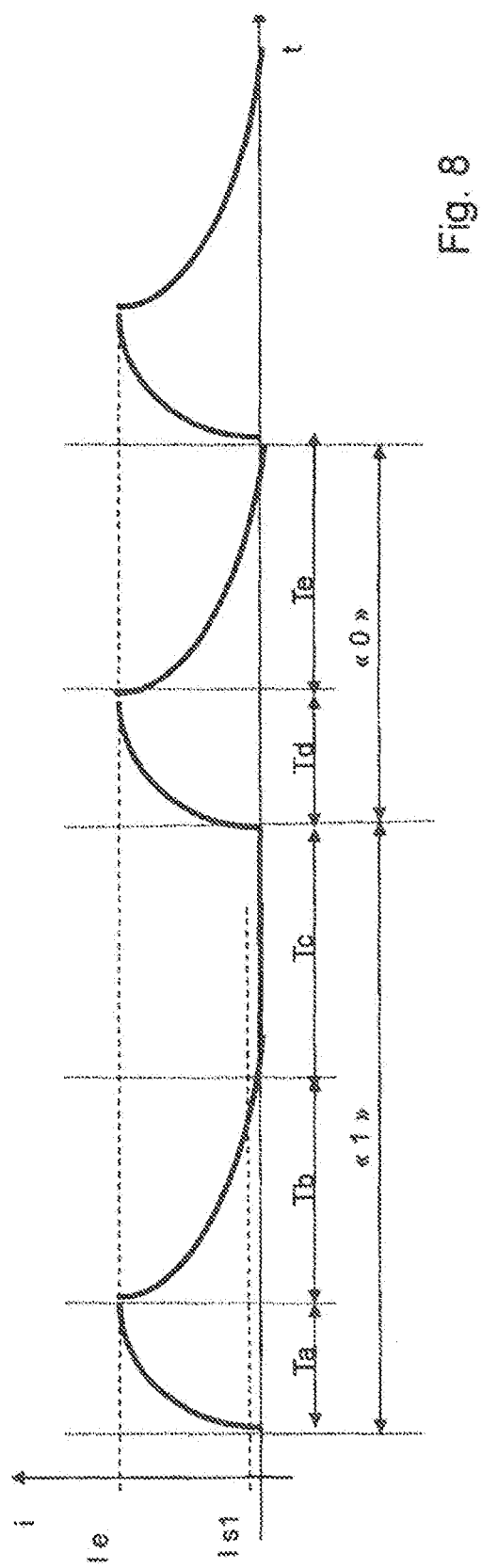
FIG. 8 represents a series of temporal variations of the signal used for the uplink communication.
Figure 9:
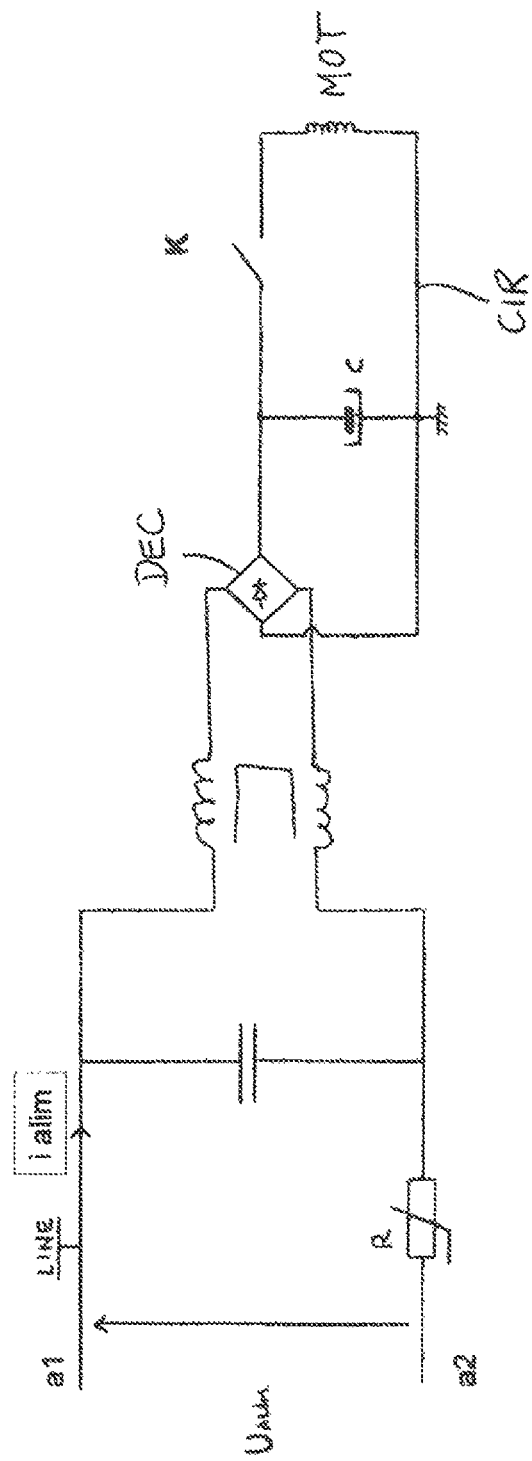
FIG. 9 represents a diagram of an actuator suitable for the implementation of a particular uplink communication mode.

In the example illustrated by FIG. 8 the actuator ACT is supplied with voltage. To represent a given binary element, the actuator ACT generates time-sequences of the response signal in terms of current I, by varying the configuration of the switches Ki according to a sequence specific to each binary element this results in a time-sequence of current specific to each binary element.

In the example illustrated by the figure the generation of the first calibration sequence SeqCal, representative of the predefined calibration binary element bCal, being equal for example to "1", comprises a sub-step of maintaining a first configuration of the switches, ensuring an impedance Za for a first duration Ta. This configuration allows the variation of the response signal in terms of current I, up to a minimum or maximum, extreme value.

Thereafter a sub-step of maintaining a second configuration of the switches, ensuring an impedance Zb for a second duration Tb, is executed. This second configuration allows the recharging of capacitive elements C of the actuator ACT, giving rise to a decay of the response signal in terms of current I.

A third sub-step of maintaining a third configuration of the switches, ensures an impedance Zc for a third duration Tc. This configuration may correspond to a maintaining of a quasi-zero response signal in terms of current I on the wires c1, c2.

In the same manner, the complementary binary element, being equal for example to "0", can be represented by a sequence of two configurations of the switches ensuring respectively the impedances Zd, Ze for durations Td, Te.

The values Zd, Td may be equal to Za, Ta, and the values Ze, Te may be equal to Zb, Tb. The time-sequence constituting the bit of value "0" may differ from the time-sequence constituting the bit of value "1" solely in that it does not comprise any sub-step of maintaining a configuration of the switches, ensuring the impedance Zc for the duration Tc. In particular, this last configuration may not exist, i.e. Tc=0.

The values of the times Ta, Tb, Tc, Td, Te, may be predetermined. Alternatively, the corresponding configurations ensuring the impedances Za, . . . , Ze are maintained as long as the response signal in terms of current I, on the wires of c1, c2 have not attained predetermined values Ia, . . . , Ie, respectively ua, . . . , uj.

The two schemes can be used for one and the same sequence: the durations Ta and Tb may be determined as a function of the response signal in terms of current I, respectively voltage u; the duration Tc may be predetermined.

For example, the duration Ta is the duration of variation of the response signal between a first predefined threshold value Is1 and an extreme value Ie; the duration Tb is the duration of variation of the response signal between the extreme value Ie, respectively ue, and a second predefined threshold value Is2, us2.

In a preferred embodiment, the time-sequence representative of the complementary binary element can be deduced from the first calibration sequence SeqCal, for example by suppressing the phase of maintaining the current at the final value of the sent pulse for the duration Tc. In the example illustrated, the durations of the pulses representative of the two binary elements are different.

A particular mode of execution of the methods which are the subject of the invention is described hereinafter with reference to FIGS. 9 to 12. In this particular mode of execution, the actuator ACT used comprises downstream of the terminals a1, a2, a decoupling element DEC making it possible in certain situations to isolate a variable-impedance circuit CIR. The decoupling element comprises for example a diode or a diode bridge. The variable-impedance circuit comprises at least one element for example a capacitor C in parallel with a series arrangement of a switch K and of a resistive element MOT such as a motor winding or coil.

In this particular mode of execution, it is possible to implement a particular uplink communication, that is to say a particular communication from the actuator ACT to the power supply and communication entity. This communication is synchronized to the power supply signal specific to the uplink communication mode.

In a first step, the power supply and communication entity generates a variation of a first type of the specific power supply signal. For example, in FIG. 10, this variation is a sharp drop of the power supply signal Ualim from a voltage V5 to a lower voltage V6.

In a second step, the actuator detects the variation of first type of the specific power supply signal. The actuator then activates the decoupling element DEC, thus isolating the circuit CIR from the terminals a1, a2. The decoupling of the circuit CIR can be obtained by the decoupling element DEC toggling to the activated state subsequent to the variation of first type of the specific power supply signal. In the example illustrated by FIG. 10, the voltage drop from the value V5 to the lower value V6 causes a diode to toggle to an of state. It follows that the current ialim becomes zero.

The actuator thereafter sets a first configuration of the circuit CIR, in particular of the at least one element, which configuration is associated with a first datum or a second configuration of the circuit CIR, in particular of the at least one element, which configuration is associated with a second datum. It is understood that the actuator implements the first configuration or the second configuration of the circuit according to the nature of the datum that it must transmit.

This configuration is maintained for a period of determined duration T1. At the end of the period, the actuator preferably returns to a default configuration. Maintaining this configuration has consequences on the circuit CIR. In the example described, maintaining the switch open causes the voltage to be maintained across the terminals of the capacitor C. On the other hand, maintaining the switch closed causes a decrease in the voltage across the terminals of the capacitor C, the latter discharging into the resistive element MOT. In the example, the first configuration corresponds to the switch K open and the second configuration corresponds to the switch K closed. In the second step represented in FIG. 10, the switch is maintained closed for the period of duration T1.

The first and the second configurations of the circuit CIR are of such a nature as to cause a first, respectively a second characteristic of the response signal during the deactivation of the decoupling element DEC, as will be explained subsequently.

In a third step, the power supply and communication entity generates a variation of a second type of the specific power supply signal. For example. in FIG. 10, this variation is a sharp increase of the power supply signal Ualim from the voltage V6 to the voltage V5. This voltage increase causes the decoupling element DEC to toggle to the deactivated state, for example a diode to toggle to an on state. It follows that the current ialim becomes nonzero and takes very different values depending on whether the circuit CIR was in the first configuration or in the second configuration for the period of determined duration T1. In the example of FIG. 10, the circuit CIR toggled to the second configuration subsequent to the first variation of first type of the specific power supply signal. It follows that the capacitor C was discharged into the resistive element MOT. Hence, subsequent to the first variation of second type of the specific power supply signal, the response signal ialim exhibits an intensity peak, the electrical energy being used to recharge the capacitor C.

In a fourth step, the power supply and communication entity generates a variation of a first type of the specific power supply signal. For example, in FIG. 10, this variation is a sharp drop of the power supply signal Ualim from a voltage V5 to a lower voltage V6. This voltage drop causes the decoupling element DEC to toggle to the activated state, for example a diode to toggle to an off state. It follows that the current ialim becomes zero.

In a sixth step, the actuator detects the variation of first type of the specific power supply signal. The actuator then set a first configuration of the circuit, in particular of the at least one element, which configuration is associated with a first datum or a second configuration of the circuit, in particular of the at least one element, which configuration is associated with a second datum. It is understood that the actuator implements the first configuration or the second configuration of the circuit according to the nature of the datum that it must transmit. This configuration is maintained for a period of determined duration T1. At the end of the period, the actuator preferably returns to a default configuration. Maintaining this configuration has consequences on the circuit CIR. In the example described, maintaining the switch open causes the voltage to be maintained across the terminals of the capacitor C. On the other hand, maintaining the switch closed causes a decrease in the voltage across the terminals of the capacitor C, the latter discharging into the resistive element MOT. In the example, the first configuration corresponds to the switch K open and the second configuration corresponds to the switch K closed. In the sixth step represented in FIG. 10, the switch is maintained open for the period of duration T'1.

Subsequent to the variations of second type of the specific power supply signal, the decoupling element DEC is deactivated, thus allowing the circuit CIR to again be coupled to the power supply and communication entity, and consequently allowing a response signal to be generated. The power supply and communication entity thereafter analyses a characteristic of the response signal, in the example the intensity of the current of the response signal ialim. The power supply and communication entity deduces from the previous analysis step, a datum associated with the characteristic. For example, an intensity ialim above a determined threshold manifests a high state or a datum whose value equals 1 and an intensity ialim below the determined threshold manifests a low state or a datum whose value equals 0.

Two variations of first and second type can compensate one another.

Two variants of the method described hereinabove are illustrated in FIGS. 11 and 12.

The variant of FIG. 11 differs from the variant of FIG. 10 in that the configurations of the circuit CIR are maintained for shorter durations T1 and T'1 than the durations separating successive variations of the specific power supply signal.

The variant of FIG. 12 differs from the variant of FIG. 10 in that the configurations of the circuit CIR are maintained for longer durations T1 and T'1 than the durations separating successive variations of the specific power supply signal.

Thus, in the mode of operation described above:
The information transmission is synchronized to the specific power supply signal (U alim, I alim).
It is the power supply and communication entity (IMS) having the function of receiver which generates the specific signal for supervising sending.
The specific power supply signal (U alim, I alim) comprises at least two distinct sequences
a writing sequence where the actuator is configured for the sending of a datum; and
a reading sequence where the power supply and communication entity receives and detects the nature of the datum.

The decoupling element can also comprise controlled electronic relays or switches (C-MOS transistors) operated subsequent to a detection of the start-of-writing sequence. In the decoupled configuration, the actuator configures the circuit CIR, that is to say the decoupled part of the electronics of the actuator, as a function of the bit or of the nature of the datum to be written or transmitted. As a function of the value of the internal impedance of the circuit CIR, different initial conditions (voltage across the terminals of the C) are established. These conditions are not "visible" to the power supply and communication entity as long as the decoupling element is active. After detection of a "start-of-reading" power supply signal, the decoupling element is deactivated. Thus, the power supply and communication entity can detect the electrical conditions established during the previous phase.

The invention claimed is:

1. Method of operating a power supply and communication entity intended to form part of a system with at least one home-automation actuator comprising an electric motor for driving a movable element in a building, the power supply and communication entity comprising two electrical terminals for linking to the actuator, making it possible to power the actuator and allowing communication between the actuator and the power supply and communication entity, the method comprising two mutually exclusive modes of operation, a command execution mode and a communication mode, to each mode of operation there corresponding a specific power supply signal, the method comprising the steps:
choice of a mode of operation,
generation between the terminals of a power supply signal specific to the mode of operation chosen, the power supply signal having a power supply voltage or a power supply current specific to the mode of operation.

2. Method according to claim 1, wherein the power supply signal specific to the command execution mode is an AC voltage and the power supply signal specific to the communication mode is a DC voltage.

3. Method according to claim 1, wherein the power supply signal specific to the command execution mode is a DC voltage having a first value and the power supply signal specific to the communication mode is a DC voltage having a second different value.

4. Method according to claim 1, wherein in downlink communication operating mode, the method furthermore comprises a step of sending data in the form of a succession of binary elements, each binary element being represented by the waveform of the power supply signal and comprising
a preamble consisting of a DC voltage having a third value, and then
a signal specific to each binary element, and then
a postamble consisting of a DC voltage having a fourth value different from the third value.

5. Method according to claim 1, wherein the method furthermore comprises a step of detecting the configuration of the actuator for the mode of operation chosen prior to the step of sending data.

6. Method according to claim 1, wherein the method furthermore comprises a step of transition between the command execution mode and the communication mode consisting in generating on the terminals a first transient power supply signal of predefined waveform and predefined amplitude.

7. Method according to claim 1, wherein the method furthermore comprises a step of transition between the communication mode and the command execution mode consisting in generating on the terminals a second transient power supply signal of predefined waveform and predefined amplitude.

8. Method according to claim 1, wherein in uplink communication operating mode, the method comprises:
generating a variation of a first type of the specific power supply signal,
generating a variation of a second type of the specific power supply signal,
analysing a characteristic of a response signal subsequent to the variation of the second type,
deducing from the previous analysis step, a datum associated with the characteristic.

9. Method according to claim 8, wherein two variations of first and second type compensate one another.

10. Method according to claim 8, wherein the specific power supply signal comprises iterations of successions:

of a DC voltage having a fifth value, and
of a DC voltage having a sixth value,
the variation of first type making it possible to pass from the fifth value to the sixth value, and
the variation of second type making it possible to pass from the sixth value to the fifth value.

11. Recording medium readable by a processor on which is recorded a computer program comprising the instructions for the execution of the steps of the method according to claim 1.

12. Method of operating a home-automation actuator comprising an electric motor for driving a movable element in a building, the actuator being able to form part of a system with a power supply and communication entity, the actuator comprising two electrical terminals for linking to the power supply and communication entity making it possible to power the actuator and allowing communication between the actuator and the power supply and communication entity,
the method comprising two mutually exclusive modes of operation, a command execution mode and a communication mode, to each mode of operation there corresponding a specific power supply signal, the method comprising the steps:
determination of at least one characteristic of the power supply signal; and
comparison of the characteristic of the power supply signal with the characteristics of the power supply signals specific to each mode of operation,
wherein the power supply signal has a power supply voltage or a power supply current specific to the mode of operation.

13. Method according to claim 12, wherein the method furthermore comprises a step of determining the mode of operation of the system and a step of configuring the actuator for the mode of operation determined.

14. Method according to claim 13, wherein the step of configuring the actuator for the mode of operation chosen comprises a sub-step of configuring the impedance of the actuator.

15. Method according to claim 12, wherein in an uplink communication mode, the method furthermore comprises a step of sending an information item by the actuator, in which the actuator performs at least one modification of its impedance seen from its electrical terminals.

16. Method according to claim 12, wherein in a downlink communication operating mode, the method furthermore comprises a step of receiving data in the form of a succession of binary elements, each binary element being represented by the waveform of the power supply signal and comprising
a preamble consisting of a DC voltage having a third value and then;
a signal specific to each binary element; and then
a postamble consisting of a DC voltage having a fourth value, different from the third value.

17. Method according to claim 12, wherein, in an up communication operating mode, the method comprises:
detecting a variation of a first type of the specific power supply signal,
bringing about a first configuration of at least one element defining a first impedance internal to a circuit of the actuator and associated with a first datum or bringing about a second configuration of the at least one element defining a second impedance internal to the circuit of the actuator and associated with a second datum,
maintaining the situation configured in the previous step for a determined duration.

18. Method according to claim 17, wherein, on completion of the determined duration, the first configuration of the at least one element is brought about.

19. Method according to claim 17, wherein the at least one element comprises a switch, notably a switch in series with a resistive element, in particular an assembly comprising a switch in series with a resistive element, the whole in parallel with a capacitor.

20. Method according to claim 19, wherein the switch is open to define the first configuration.

21. Method according to claim 17, wherein, subsequent to the step of detecting the variation of the first type, the circuit is decoupled from the electrical terminals, notably by activation of a decoupling element.

22. Method according to claim 17, wherein, subsequent to a step of detecting a variation of a second type of the specific power supply signal, the circuit is coupled to the electrical terminals, notably by deactivation of a decoupling element.

23. Recording medium readable by a processor on which is recorded a computer program comprising the instructions for the execution of the steps of the method according to claim 12.

24. Power supply and communication entity intended to form part of a system, with at least one home-automation actuator comprising an electric motor for driving a movable element in a building, the power supply and communication entity comprising:
two electrical terminals making it possible to power the actuator and allowing communication between the actuator and the power supply and communication entity;
means:
for implementing at least two mutually exclusive modes of operation, a command execution mode and a communication mode, to each mode of operation there corresponding a specific power supply signal; and
for choosing a mode of operation;
for generating between the electrical terminals a power supply signal specific to the mode of operation chosen,
wherein the power supply signal has a power supply voltage or a power supply current specific to the mode of operation.

25. Home-automation actuator comprising an electric motor for driving a movable element in a building, the actuator being able to be used in a system, with a power supply and communication entity, the actuator comprising:
two electrical terminals for linking to the power supply and communication entity making it possible to power the actuator and allowing communication between the actuator and the power supply and communication entity;
means
for implementing at least two mutually exclusive modes of operation, a command execution mode and a communication mode, to each mode of operation there corresponding a specific power supply signal; and
for determining at least one characteristic of the power supply signal; and
for comparing the characteristic of the power supply signal with the characteristics of the power supply signals specific to each mode of operation,
wherein the power supply signal has a power supply voltage or a power supply current specific to the mode of operation.

26. Actuator according to claim 25, wherein the actuator comprises means for determining the mode of operation of the system and means for placing in configuration for the mode of operation determined.

* * * * *